United States Patent Office 2,833,741
Patented May 6, 1958

2,833,741

METHOD OF POLYMERIZING ACRYLATE ESTERS IN THE PRESENCE OF AN ORGANO-METALLIC INHIBITOR

Joginder Lal, Drexel Hill, Pa., assignor to H. D. Justi & Son, Inc., Philadelphia, Pa., a corporation of Pennsylvania No Drawing. Application March 29, 1956
Serial No. 574,582

9 Claims. (Cl. 260—45.5)

The invention relates to a method of polymerizing an ester of acrylic or methacrylic acid in the presence of a free radical polymerization catalyst and a metal organic compound of the formula $R_1R_2R_3Me$ wherein $R_1$ and $R_2$ are phenyl, tolyl or alkoxyphenyl $R_3$ is phenyl, tolyl alkoxyphenyl or alkylol such as ethanol and Me is antimony, phosphorus, arsenic or bismuth, said metal organic compound stabilizing the ester in monomeric form prior to polymerization and providing solid products of improved transparency, clarity and brilliance after polymerization.

A liquid polymerizable organic compound of the kind just mentioned has incorporated therein a member of the class consisting of the trivalent hydrocarbon-substituted compounds of antimony, phosphorus, arsenic and bismuth, said compounds represented by the general formula in which the preferred trivalent compounds of antimony are illustrated by the formula as follows:

where $R_1$ and $R_2$ may be phenyl, tolyl, alkoxyphenyl or other aryl group, $R_3$ may be phenyl, tolyl, alkoxyphenyl, other aryl, or a lower alkyl such as methyl, ethyl, propyl, butyl or alkylol such as ethanol and Me stands for antimony, phosphorus, arsenic or bismuth. Examples are: triphenyl-stibine, tri-p-tolyl-stibine, tri-o-tolyl-stibine, tri-m-tolyl-stibine, trimethoxy-phenyl-stibine (o, m, p), methyl di-phenyl stibine, ethanol di-p-tolyl stibine, etc.

Preferred metal organic compounds are represented by the formula

where $R_1$, $R_2$ and $R_3$ are as defined above and Sb stands for antimony. The groups $R_1$ and $R_2$ may be similar or dissimilar in nature. It has been found that a hydrocarbon substituted trivalent metal compound of the class indicated, having at least two aryl radicals in attachment to metal, incorporated in small amounts sufficiently inhibit the polymerization of the above polymerizable compounds under all of the conditions ordinarily encountered in storage or handling preparatory to carrying out the polymerization of said compounds.

An unusual advantage which is obtained by the inhibitors of the present invention, preferably the trivalent aryl stibines, lies in the fact that minimum quantities may be employed, even less than required of hydroquinone, the amount being sufficient to inhibit polymerization and at the same time obviating the need as with hydroquinone of removing the stabilizer from the polymerizable monomer prior to polymerization.

As a result, there is provided a remarkable improvement in the handling of the polymerizable monomer and in the color characteristics of the product produced. This is of particular importance in the preparation of transparent polymers from such monomers as methyl methacrylate, methyl acrylate, ethylene glycol dimethacrylate, tetramethylene glycol dimethacrylate, cyclic methacrylates such as tetrahydrofurfuryl methacrylate, allyl monomers such as diallyl phthalate, cycloaliphatic esters such as cyclohexyl methacrylate or acrylate, higher molecular weight esters of acrylates such as lauryl acrylate or methacrylate, and various copolymers and interpolymers of these monomers.

In the past, hydroquinone, pyrogallol, copper salts and the like have been used as inhibitors against polymerization of these monomeric organic compounds, however, these inhibitors have possessed the disadvantage that they need be removed from the polymerizable compound before the compound is adapted for its intended use. Either by distilling or by extracting the inhibitor from the compound before it is used, the inhibitor is removed in order to provide the desired transparency properties required in the final product produced.

Pyrogallol and hydroquinone are usually removed by extracting the monomer with a dilute aqueous alkaline solution, such as sodium hydroxide and an after-treatment of the monomer, which is in an alkaline condition, by washing with water to remove alkali and thereafter drying. This removal process inherently causes mechanical and chemical losses of the polymerizable compound, requires equipment to carry out the operation and many man hours are utilized in such operations to add substantially to the cost of the product made.

An ideal inhibitor should impart no color to the finshed product. An inhibitor which need not be removed while preserving properties of the product is manifestly of great importance.

Stabilization of monomers such as acrylic monomers may be effected by the utilization of minimum amounts of hydroquinone (25 parts per million) and thereafter, this stabilized monomer may be polymerized without removing the hydroquinone by employing a suitable peroxide such as a 1% solution of hydrogen peroxide. In the presence of the hydroquinone under polymerizing conditions in which such peroxides are employed, a yellow color is imparted to the final solid polymer produced. This color is objectionable for many uses, particularly so in dentistry. This disadvantage is one which is overcome by the present invention.

An object of the invention is to provide improved inhibitors for stabilizing polymerizable compositions which need not be removed when such compositions are converted into resinous products under polymerizing conditions.

Other and further objects of the present invention will appear from the more detailed description set forth below; the following illustrative examples thereof being given.

EXAMPLE 1

0.005 gram of hydroquinone was dissolved in 100 grams of freshly distilled methyl-methacrylate. Twenty millilitres of this solution were placed in a cleaned one ounce clear bottle, which was then closed tightly by a screw cap. Similarly, 20 ml. of 0.005 percent solution of triphenylstibine in distilled methyl methacrylate were placed in another one ounce bottle.

The two bottles were placed in an oven maintained at 60° C. Neither of these monomer samples showed any visible signs of polymerization for 45 days.

EXAMPLE 2

The stability of distilled methyl methacrylate at 60° C. was also studied as in Example 1 in the presence of other inhibitors in varying concentration. The results are shown in Table 1.

Table 1

| Conc. of Inhibitor | Time (hours) of Polymerization | | |
|---|---|---|---|
| | Hydro-quinone | p-Benzyl-oxyphenol | Triphenyl-stibine |
| .006 percent | >260 | >260 | >260 |
| .003 percent | >260 | >260 | <260 |
| .0015 percent | >260 | >260 | <260 |
| .0006 percent | >260 | >260 | <260 |
| .0003 percent | >260 | >260 | <96 |
| .00015 percent | >260 | >260 | <96 |
| | <260 | <260 | <96 |

EXAMPLE 3

Freshly distilled ethylene dimethacrylate was subjected to similar tests, as in Example 2, and tested at the same concentrations; none of the samples has polymerized in 120 hours.

EXAMPLE 4

A monomer mixture containing 10 percent by weight of ethylene dimethacrylate and 90 percent methyl methacrylate was subjected to stability test as in Example 3 and the results were the same here as in Example 3.

EXAMPLE 5

0.015 gram of triphenylstibine was dissolved in 100 grams of methyl methacrylate. Twenty grams of this monomer were polymerized in the presence of 40 milligrams of benzoyl peroxide in an atmosphere of nitrogen in a sealed tube at 60° C. A clear, hard polymerized material was obtained in about 8 hours.

The above run was repeated by substituting hydroquinone in place of triphenylstibine. The monomer did not change to a viscous mass until after 72 hours. The hard, polymerized mass obtained after 96 hours has a yellow color, in the presence of this amount of hydroquinone.

The above run was also repeated using no inhibitor in the monomer. A clear, hard polymerized material was obtained after about 4 hours.

The polymerized sample obtained with triphenylstibine as inhibitor was more transparent than when no inhibitor was used.

EXAMPLE 6

The difference between hydroquinone and triphenylstibine is also shown clearly in the polymerized samples obtained by the thermal polymerization of polymer-monomer doughs.

Thirty millilitres of fine polymethyl methacrylate (pearl polymer) were mixed with 15 millilitres of methyl methacrylate containing 0.015 percent by weight of triphenylstibine. The resulting dough was polymerized in a plaster mold according to standard dental procedure by immersing the mold in water at 158° F. for one hour and at 212° F. for ½ hour. The polymerized sample, 2½" x 2" x ¼", was buffed to give a smooth transparent surface.

Similarly, polymerized samples were obtained by repeating the above procedure but using monomer which in one case did not contain any inhibitor and in the other case contained 0.015 percent of hydroquinone. The sample obtained using hydroquinone as inhibitor had a yellowish color. The sample containing triphenylstibine had no such yellowish color and was slightly more transparent than the sample obtained from uninhibited monomer.

EXAMPLE 7

In this example, the usefulness of triphenylstibine as a substitute for hydroquinone as an inhibitor is illustrated in the amine-peroxide activated polymerization of a polymer-monomer dough.

Thirty millilitres of fine polymethyl methacrylate (pearl polymer) containing 2 percent by weight of added benzoyl peroxide were mixed with 15 millilitres of methyl methacrylate containing 0.4 percent by weight of N,N-dimethyl-p-toluidine and 0.006 percent by weight of triphenylstibine. The resulting dough was compressed in a plaster mold cavity 2½" x 2" x ¼". The dough polymerized to a hard mass in about 8 minutes. The polymerized sample was removed from the mold after 15 minutes and was buffed to give a smooth transparent surface. A similar sample was obtained by repeating above procedure except that the monomer contained 0.006 percent of hydroquinone instead of triphenylstibine.

The polymerized sample using hydroquinone as inhibitor had a brown color, whereas the sample containing triphenylstibine was free from any brown or other color.

Each of these samples was cut into two halves. One half of each sample was subjected to the effect of heat and light according to the ASTM D620–49 test for 24 hours. These exposed halves were then compared with the unexposed halves. The extent of discoloration between the exposed and the unexposed halves containing hydroquinone was much greater than the discoloration difference observed between the exposed and the unexposed halves containing triphenylstibine.

When the above runs were repeated using 0.0125 percent of triphenylstibine and 0.0125 percent hydroquinone in the monomer, the superiority of triphenylstibine over hydroquinone was even more readily apparent in view of the lack of coloration of the triphenylstibine product.

EXAMPLE 8

Stability tests at 60° C. were carried out by the process as in Example 2, at a concentration of 0.10% of triphenyl stibine in methyl methacrylate monomer, at a minimal concentration of 0.0006% and at an intermediate concentration of 0.005% and 0.05% in the same monomer. The results were comparable to that obtained in Example 2 in that all samples were effectively inhibited for periods upwards of 260 hours, without any polymerization or thickening of the samples. Further, all samples were effectively polymerized to transparent, hard, solid polymers without removal of inhibitor by the process of Example 5.

Corresponding stability studies at prevailing room temperatures (15–25° C.) indicate that these stabilizer monomer compositions in dark brown bottles (to protect the samples against actinic light) have a stable shelf life of at least about 6–8 months. However, the samples containing 0.005% and 0.05% of inhibitor were found to be more desirable than the sample having 0.0006% of inhibitor, particularly for the stabilization of methyl methacrylate of technical purity.

These samples of technical purity can be more effectively stabilized by the higher amounts of stabilizer against trace impurities having a catalytic polymerization action and which may arise by contamination during commercial manufacture or container filling. The amount of 0.10% is just as effective but somewhat wasteful of the material, and smaller amounts are desirable for technical purposes.

A comparison of these preferred amounts with the amounts of hydroquinone employed provides a striking indication of the superiority of the invention. As against 0.006% hydroquinone for commercial methacrylate and a minimum of 0.0025% for refined grade, the stabilizer compounds of the invention, and illustratively triphenyl stibine, is required in an amount of about 0.003–0.005% for commercial grade and about 0.0015–0.0020% for the refined grade. Further, amounts of about 0.005% are effective for rigorous conditions of stabilization, such as in overseas shipment, with the advantage that the material is ready for use by the addition of polymerization catalyst.

Because of the direct utility for polymerization of the stabilized monomers employing as stabilizers, the trivalent hydrocarbon substituted stibines, bismuthines, arsines or phosphines, these stabilized monomers are available as an article of commerce having excellent shelf life and for direct application in laboratory and commercial polymerization processes.

Preferably for small scale work the stabilized monomer according to the invention may be packaged in brown or otherwise anti-actinic coated or tinted glass containers of standard size, ½ oz. to 16 oz. size, or in gallon drum sizes up to 55 gallon lots.

The monomers most effectively stabilized are those having a relatively high reactivity for free-radical polymerization, and in general the amount of inhibitor most effective in stabilizing a particular monomer varies in accordance with said reactivity of the monomer. Alpha alkyl substituted methacrylates are known to be particularly reactive, especially those which are structurally substituted by activating groups.

Thus the amount of stabilizer effective for methyl methacrylate is about the same amount in a molar basis as with higher methacrylates or alpha chloromethacrylates. Slightly larger amounts may be desirable with very active monomers such as tetrahydrofurfuryl methacrylate and acrylic esters.

EXAMPLE 9

Stability tests in the concentrations set forth in Example 2, Table 1 were carried out with the following inhibitors: methyl di-p-tolyl stibine, ethyl di-phenyl stibine and methyl di-phenyl stibine. At a concentration of inhibitor of about 0.005% and .0003%, polymerization was inhibited with each of these materials for a period of 260 hours and more.

On polymerizing each of the above in accordance with the procedure of Example 5, a clear, hard polymerized material was obtained.

EXAMPLE 10

Concentrations of about 0.005% of triphenyl phosphine, triphenyl arsine, and of triphenyl bismuthine were found to be effective to inhibit polymerization as tested by the procedure set forth in Example 2 and peroxide polymerization of these stabilized methacrylate compositions by the procedure set forth in Example 5 produced transparent, hard products.

Quick set amine-promoted peroxide catalyzed polymerization reactions of the free-radical mechanism are of especial advantage in direct polymerization of the stabilized monomer compounds of the present invention. The amine promoters are usually aliphatic, aromatic heterocyclic or mixed-type aromatic tertiary amines, such as tri-butyl amine, N-methyl morpholine, di-methyl aniline, di-methyl-p-toluidine, phenyl diethanol amine, or they may be amides, imides, sulphonamides, aromatic sulfinic acids (p-toluene sulfinic acid) which are used with an organic peroxide or a persulfate catalyst. About 1% or less of promoter based upon the weight of the monomer is employed, and generally the amount of promoter is less than the amount of catalyst employed, the ratio of these two being readily adjusted.

To obtain optimum results with the stabilized monomers of the invention the amine promoters should not be of the type which discolors the polymerized product; on this basis dimethyl p-toluidine (fast) or tri-hexylamine (slower) is preferable to dimethyl aniline which although fast provides highly colored products. Other satisfactory promoters are N,N-dimethyl para ethyl benzene, N,N-diethyl para toluidine, N,N-di-hydroxyethyl aniline and meta-tolyl diethanolamine. Where cost is a factor, smaller amounts of dimethyl aniline may be satisfactory at the expense of some discoloration. Although the tertiary aliphatic amines do not discolor as severely as the aromatic amines, to compensate for their slowness larger amounts are employed and they tend to cause discoloration of the product in time.

The diaryl alkyl and triaryl stibines, phosphines, bismuthines and arsines may be prepared by conventional procedures from the corresponding trichloride of the corresponding metal. The preparation of triphenyl stibine from antimony trichloride and phenyl magnesium bromide or iodide is well known. For the diaryl alkyl compounds using the methods of Arbuzov, J. Russ Phys. Chem. Soc., 1910, 42, 395, and Meisenheimer Annalen 1926, 449, 227 of Grüttner and Wiernik, Berichte 1915, 48, page 1759, may be employed. One may start with phenyl dichlorophosphine or diphenyl monochloro phosphine (or the corresponding bismuthine, stibine or arsine) and react with one or more moles of the desired alkyl (methyl magnesium iodide) or aryl (phenyl magnesium iodide) Grignard reagent in an ethereal solution under a nitrogen atmosphere to give the desired product which after washing and drying is separated by fractional distillation under vacuum.

These derivatives on standing are oxidized in the air and accordingly may be conveniently handled in small amounts of an inert solvent (petroleum ether) or under an atmosphere of carbon dioxide or nitrogen until ready for use. However, these derivatives are readily soluble in the monomer compounds and may be used in these as a solvent. The derivatives are less reactive than the corresponding halide.

In accordance with the foregoing examples it is seen that from about 0.0006% to about 0.10% of the inhibitors of the present invention on the basis of the weight of the monomer effectively stabilize polymerizable monomers containing in the molecule the polymerizable grouping

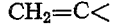

preferably monomer compounds, such as acrylate and methacrylate compounds without requiring removal of said inhibitors or interfering with polymerization and to provide highly transparent products which are superior to those obtained when hydroquinone is used. Because of this advantage, the inhibitor of the present invention and polymerizable compositions stabilized with such monomer have particular utility in the fabrication of dental restoration or in preparing cast or molded optical components, or for aircraft closures, etc. for which applications, transparency is important.

In accordance with the invention, from about 0.0006% to about 0.10% of the inhibitors of the present invention may be used with small quantities, up to about 100 parts per million, of other inhibitors such as hydroquinone, pyrogallol and the like to provide in such mixtures of inhibitors with the polymerizable compositions, a polymerizable composition which will produce more transparent products than can be obtained when the inhibitors of the present invention are omitted. Thus, where minimum amounts of hydroquinone are utilized commercially in monomers which are polymerized by conventional procedures without the removal of the hydroquinone therefrom, and where such compositions prior to polymerization are required to be stored for extended periods, the addition of the inhibitors of the present invention to such compositions permits longer storage periods to be attained without any polymerization being observed during storage and at the same time permits the advantage of direct polymerization of such stabilized compositions without the removal of any of the inhibitor therefrom to produce more transparent products.

Having thus disclosed the invention, what is claimed is:

1. A method of forming a polymer of an ester of an acid selected from the group consisting of acrylic acid and methacrylic acid comprising polymerizing said ester in the presence of an organic peroxide polymerization catalyst and from about 0.0006 to about 0.1% of a metal organic compound of the formula $R_1R_2R_3Me$ wherein $R_1$ and $R_2$ are selected from the group consisting of phenyl, tolyl and alkoxyphenyl, $R_3$ is selected from the group consisting of phenyl, tolyl alkoxyphenyl, lower alkyl and alkylol and Me is a metal selected from the group consisting of antimony, phosphorous, arsenic and bismuth.

2. A method as claimed in claim 1 wherein said ester is ethylene dimethacrylate.

3. A method as claimed in claim 1 wherein said ester is allyl methacrylate.

4. A method as claimed in claim 1 wherein said ester is an ester of methacrylic acid.

5. A method as claimed in claim 1 wherein said metal organic compound is triphenyl stibine.

6. A method as claimed in claim 1 wherein said metal organic compound is ethyl diphenyl stibine.

7. A method as claimed in claim 1 wherein said metal organic compound is methyl ditolyl stibine.

8. A method as claimed in claim 1 wherein said metal organic compound is symmetrical trimethoxyphenyl stibine.

9. A method as claimed in claim 1 wherein said polymerization is carried out in slurry admixture with methyl methacrylate homopolymer.

References Cited in the file of this patent

UNITED STATES PATENTS 2,314,466  Thwaites _____ Mar. 23, 1943